United States Patent Office 3,636,224
Patented Jan. 18, 1972

3,636,224
METHODS OF INDUCING HYPNOSIS
Sidney Robert Safir, River Edge, N.J., and Eugene Newton Greenblatt, Spring Valley, N.Y., assignors to American Cyanamid Company, Stamford, Conn.
No Drawing. Filed Nov. 20, 1970, Ser. No. 91,593
Int. Cl. A61k 27/00
U.S. Cl. 424—270  4 Claims

ABSTRACT OF THE DISCLOSURE

Compositions containing 5 - acetylimino - N-ethyl - 4-methyl - $\Delta^2$ - 1,3,4 - thiadiazoline - 2 - sulfonamide and their method of use is described. The compositions are useful for their ability to produce hypnosis when given orally to warm-blooded animals.

DESCRIPTION OF PRIOR ART

In U.S. Pat. 2,940,980 are described novel 5-acylimino-N-alkyl-4-$\Delta^2$-1,3,4-thiadiazoline - 2 - sulfonamides which have the capacity to produce a state of general anesthesia, useful for carrying out surgical procedures upon intravenous administration in man and animals.

DESCRIPTION OF INVENTION

We have now found that 5-acetylimino-N-ethyl-4-methyl-$\Delta^2$-1,3,4-thiadiazoline-2-sulfonamide, a compound described in the aforementioned U.S. Pat. 2,940,980, shows unexpectedly remarkable properties in that, in addition to intravenous surgical anesthetic activity 5-acetylimino-N-ethyl-4-methyl-$\Delta^2$-1,3,4-thiadiazoline - 2 - sulfonamide has the ability, by oral administration, to induce and maintain a state of sleep in warm-blooded animals. This unexpected finding indicates a therapeutic utility in warm-blooded animals in the treatment of sleeplessness.

In the past, compounds having oral hypnotic activity have been utilized to depress sensory and mental processes, to lower perception of external stimuli for the purpose of inducing and maintaining sleep. Many such hypnotic agents, however, produce generalized central nervous system depressant effects along with their hypnotic effects. Other hypnotics are effective only for short periods when administered in small doses but the hypnotic action progresses quickly to produce stupor or eventual coma with increasing doses. When such hypnotics are used orally at sufficient doses to induce sleep, they often make for difficulty of arousal and produce in warm-blooded animals unpleasant feelings of grogginess as an after effect. Also, some of the hypnotics used in the past have a tendency to cause undesirable side effects as an initial mood of agitation or excitement, blood dyscrasias, cardiac and respiratory depression and even drug tolerance which may end in physical dependence or other pathologies due to cumulative effects.

We have found that 5-acetylimino-N-ethyl-4-methyl-$\Delta^2$-1,3,4-thiadiazoline - 2 - sulfonamide produces hypnosis without the usual side effects. The compositions of this invention contain 5-acetylamino-N-ethyl - 4 - methyl - $\Delta^2$-1,3,4-thiadiazoline-2-sulfonamide as the active compound of this invention. This compound is a white crystalline solid relatively insoluble in water but soluble in the lower alkanols, acetone, lower alkoxyalkanols and the like. The compositions containing the active compounds are free of side effects of many currently used hypnotics such as barbiturates, chloral hydrate and the like. The compositions are effective in inducing a prompt sense of relaxation followed by sleep from which arousal to full awareness is accomplished without indication of intoxication or torpor.

The oral compositions of the present invention containing as the active ingredient 5-acetylimino-N-ethyl-4-methyl-$\Delta^2$-1,3,4-thiadiazoline - 2 - sulfonamide have been found useful when the active component is present in from 50 milligrams to 400 milligrams per dosage unit. The total dosage per day may vary from 50 to 1600 milligrams.

The usual criterion of hypnotic effect of a drug experimentally administered to warm-blooded animals such as mice, for example, is the inability to right themselves spontaneously after being placed on their backs or sides. Normal or "control" mice perform the righting action immediately. The disability is termed "loss of righting reflex." Groups of at least ten male Swiss albino mice (Manor Farms) are treated intraperitoneally with three graded dose levels of 5-acetylimino-N-ethyl-4-methyl-$\Delta^2$-1,3,4-thiadiazoline-2-sulfonamide. Groups of at least ten mice per group were treated orally with four graded doses of 5-acetylimino-N-ethyl-4-methyl - $\Delta^2$ - 1,3,4 - thiadiazoline-2-sulfonamide. In addition, groups of at least eight male Wistar rats (Royal Hart) were treated intraperitoneally with three graded doses of 5 - acetylimino - N - ethyl-4-methyl-$\Delta^2$-1,3,4-thiadiazoline 2-sulfonamide. The doses causing 50% of the animals to lose the righting reflex ($LR_{50}$) were calculated by the method of Litchfield and Wilcoxon [J. Pharmacology and Experimental Therapeutics, vol. 96, pp. 99–113 (1949)]. The calculated $LR_{50}$'s in milligrams per kilogram of body weight are shown below:

| Species | Route of administration | $LR_{50}$ |
|---|---|---|
| Mice | Intraperitoneal | 202 |
| Do | Oral | 580 |
| Rats | Intraperitoneal | 130 |

Sodium phenobarbital, a reference hypnotic agent, shows an $LR_{50}$ in mice at 138 milligrams per kilogram intraperitoneally. The dose of 5-acetylimino-N-ethyl-4-methyl-$\Delta^2$-1,3,4-thiadiazoline-2-sulfonamide causing death in 50% of the mice ($LD_{50}$, as calculated by the method of Litchfield and Wilcoxon) is 1130 milligrams per kilogram intraperitoneally and 3900 milligrams per kilogram orally. For sodium phenobarbital, the $LD_{50}$ is 250 milligrams per kilogram intraperitoneally. In mice, the ratios of the median lethal dose to the median hypnotic dose are shown below:

| Compound | Route of administration | $LD_{50}$, mg./kg. | $LR_{50}$, mg./kg. | $\dfrac{LD_{50}}{LR_{50}}$ |
|---|---|---|---|---|
| 5-acetylimino-N-ethyl-4-methyl-$\Delta^2$-1,3,4-thiadiazoline-2-sulfonamide. | Intraperitoneal | 202 | 1,130 | 5.6 |
| 5-acetylimino-N-ethyl-4-methyl-$\Delta^2$-1,3,4-thiadiazoline-2-sulfonamide. | Oral | 580 | 3,900 | 6.7 |
| Sodium phenobarbital | Intraperitoneal | 138 | 250 | 1.8 |

The wide range between the effective hypnotic and lethal doses is highly desirable and is obviously advantageous over that of sodium phenobarbital.

The active component of this invention and a pharmaceutically acceptable carrier can be used in compositions such as tablets; the principal active ingredient is mixed with conventional tableting ingredients such as corn starch, lactose, sucrose, sorbitol, talc, stearic acid, mangesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the active component of the present invention may be incorporated for administration include suitably flavored emulsions with edible oils, such as, cottonseed oil, sesame oil, coconut oil, peanut oil, and the like, as well as elixirs and similar pharmaceutical vehicles.

The term dosage form as described herein refers to physically discrete units suitable as unitary dosage for warm-blooded animals each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such as active component for therapeutic use in warm-blooded animals as disclosed in this specification. Examples of suitable oral dosage forms in accord with this invention are tablets, capsules, pills, powders packets, granules, wafers, cachets, teaspoonfuls, dropperfuls, ampules, vials, segregated multiples of any of the foregoing and other forms as herein described.

EXAMPLE 1

Preparation of 5-acetylimino-N-ethyl-4-methyl-$\Delta^2$-1,3,4-thiadiazoline-2-sulfonamide To a mixture of 106.1 g. (0.40 mole) of 2-acetamido-5-benzylmercapto-1,3,4-thiadiazole, and 200 ml. of water, is added 26.2 g. (0.467 mole) of 85% potassium hydroxide. The solution is diluted with 200 ml. of ethanol and then 52 g. (0.42 mole) of dimethyl sulfate is added rapidly in one portion. The mixture is heated at reflux temperature for 5 minutes and then cooled to 15° C. before being diluted with 200 ml. of 4 N sodium hydroxide. After solidification has begun, 250 ml. of water is added. The mixture is stirred, cooled for 1 hour and filtered. The insoluble solid product consists of 68 grams of 5-acetylimino-2-benzylmercapto-4 - methyl - $\Delta^2$ - 1,3,4-thiadiazoline, melting point 62–75° C. A solution of 11.2 g. (0.042 mole) of 5 - acetylimino - 2 - benzylmercapto-4-thiadiazoline in 40 ml. of acetic acid containing 4 ml. of water is cooled to 15° C. and a stream of chlorine gas is bubbled in rapidly for 15 minutes while the reaction temperature is maintained at 25° C. The solution is poured onto 200 ml. of ice water and the resulting product, 5-acetylimino-4-methyl - $\Delta^2$ - 1,3,4 - thiadiazoline - 2-sulfonyl chloride, is collected by filtration, and washed with water and a small quantity of ether. They yield amounts to 10 g. To a solution of 9 g. (0.20 mole) of ethylamine in 50 ml. of benzene, is added, in portions, 25.5 g. (0.1 mole) of 5-acetylimino-4-methyl-$\Delta^2$-1,3,4-thiadiazoline-2-sulfonyl chloride. The reaction mixture is evaporated to dryness under reduced pressure, and the resulting solid residue is slurried in water and filtered. The insoluble white solid is recrystallized from ethanol to give 17 g. of 5-acetylimino-N-ethyl-4 - methyl - $\Delta^2$ - 1,3,4-thiadiazoline-2-sulfonamide as a white solid, melting point 154–155° C.

EXAMPLE 2

The compound of the present invention can be dispensed in dosage unit form such as hard shell capsules or soft shell capsules. A useful formulation for the preparation of such capsules is as follows:

| | Per 100 capsules, grams |
|---|---|
| 5 - acetylimino-N-ethyl-4-methyl-$\Delta^2$-1,3,4-thiadiazoline | 60.0 |
| Lactose, USP | 60.0 |
| Magnesium stearate (0.5%) | 3.125 |
| Total | 123.125 |

The above formulation is thoroughly mixed and placed as equal quantities in 100 capsules. Each capsule contains 600 milligrams of active ingredient.

EXAMPLE 3

The following example represents a formulation useful in preparing tablets or oblets. Larger tablets can be scored and divided into halves or quarters to be given one to four times a day. Obviously, multiple doses of this tablet can be used to obtain a larger daily amount of active material.

| | Per tablet, mg. |
|---|---|
| 5-acetylimino-N-ethyl - 4 - methyl-$\Delta^2$-1,3,4-thiadiazoline-2-sulfonamide | 50 |
| Cornstarch | 100 |
| Methylcellulose 400 | 175 |
| Magnesium stearate 1% | 100 |
| Total | 425 |

EXAMPLE 4

The compound of the present invention can also be given in the form of tablets containing other ingredients as follows:

| | Per tablet, grams |
|---|---|
| 5-acetylimino-N-ethyl - 4 - methyl-$\Delta^2$-1,3,4-thiadiazoline-2-sulfonamide | 1.0 |
| Cornstarch | 0.4 |
| Ethylcellulose N 10 | 0.005 |
| Magnesium stearate 1% | 0.002 |
| Total | 1.407 |

Each tablet contains 1.0 g. of active ingredient. This tablet may be scored and divided into halves or quarters to suit the specific need.

We claim:
1. A method of inducing hypnosis in warm-blooded animals which comprises orally administering to warm-blooded animals in need of such treatment a composition having as the essential active ingredient 5-acetylamino-N-ethyl - 4 - methyl-$\Delta^2$-1,3,4-thiadiazoline-2-sulfonamide, said composition being in an amount to produce hypnosis.

2. A method in accordance with claim 1, wherein the 5-acetylamino-N-ethyl - 4 - methyl-$\Delta^2$-1,3,4-thiadiazoline-2-sulfonamide is orally administered in dosage form containing from 50 to 400 mg.

3. A method in accordance with claim 1, wherein the composition is in the form of a tablet.

4. A method in accordance with claim 1, wherein the composition is in the form of a capsule.

References Cited

UNITED STATES PATENTS 2,940,980   6/1960   Lopresti et al. _____ 424—270

JEROME D. GOLDBERG, Primary Examiner

UNITED STATES PATENT OFFICE
CERTIFICATE OF CORRECTION

Patent No. 3,636,224          Dated January 18, 1972

Inventor(s) Sidney Robert Safir and Eugene Newton Greenblatt

It is certified that error appears in the above-identified patent and that said Letters Patent are hereby corrected as shown below:

Column 2 lines 46 to 49, please change the heading from

"Compound    Route of administration    $LD_{50}$ mg./kg.    $LR_{50}$ mg./kg.    $\frac{LD_{50}}{LR_{50}}$" to read -- Compound    Route of administration    $LR_{50}$ mg./kg.    $LD_{50}$ mg./kg.    $\frac{LD_{50}}{LR_{50}}$ --

Signed and sealed this 4th day of July 1972.

(SEAL)
Attest:

EDWARD M. FLETCHER, JR.          ROBERT GOTTSCHALK
Attesting Officer                 Commissioner of Patents